United States Patent
Gillard et al.

(10) Patent No.: US 10,122,981 B2
(45) Date of Patent: Nov. 6, 2018

(54) COLOR CONVERSION

(71) Applicant: Sony Corporation, Tokyo (JP)

(72) Inventors: Clive Henry Gillard, Alton (GB); Stephen Mark Keating, Reading (GB)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 15/217,476

(22) Filed: Jul. 22, 2016

(65) Prior Publication Data

US 2017/0070717 A1   Mar. 9, 2017

(30) Foreign Application Priority Data

Sep. 8, 2015 (GB) .................................. 1515873.6

(51) Int. Cl.
*G06K 9/00* (2006.01)
*H04N 9/73* (2006.01)
*H04N 9/77* (2006.01)

(52) U.S. Cl.
CPC ............... *H04N 9/735* (2013.01); *H04N 9/77* (2013.01)

(58) Field of Classification Search
USPC ................................................. 382/162–167
See application file for complete search history.

(56) References Cited

U.S. PATENT DOCUMENTS

| | | | |
|---|---|---|---|
| 6,453,068 B1 * | 9/2002 | Li | G06T 5/002 358/1.9 |
| 8,237,689 B2 * | 8/2012 | Nagase | H04N 19/147 345/204 |
| 2004/0119995 A1 * | 6/2004 | Nishi | H04N 1/6027 358/1.9 |
| 2004/0161145 A1 * | 8/2004 | Embler | G06T 3/4015 382/165 |
| 2005/0008243 A1 * | 1/2005 | Fujino | G03G 15/50 382/254 |

(Continued)

FOREIGN PATENT DOCUMENTS

GB          2523763 A       9/2015

*Primary Examiner* — Alex Liew
(74) *Attorney, Agent, or Firm* — Oblon, McClelland, Maier & Neustadt, L.L.P.

(57) ABSTRACT

Color conversion apparatus comprises mapping circuitry configured to map pixels of an input image having color components in an input color space to pixels of an mapped image having color components in an output color space, the input color space and the output color space being different color spaces such that at least a subset of colors representable in the input color space are not representable in the output color space; processing circuitry configured to process the mapped image by detecting instances, in the color components of pixels of the mapped image, of representations of negative amounts of a color component and in response to such a detection in respect of a pixel under test, to increase all of the color components of the pixel under test by an amount of at least the magnitude of the greatest magnitude negative amount of the color components of that pixel under test; and output circuitry configured to generate pixels of an output image, having color components in the output color space, from pixels of the processed mapped image, the output circuitry being configured to inhibit color components of pixels of the output image from exceeding a maximum representable color amount.

11 Claims, 4 Drawing Sheets

(56) References Cited

U.S. PATENT DOCUMENTS

| | | | |
|---|---|---|---|
| 2006/0072158 A1* | 4/2006 | Christie | H04N 1/40012 |
| | | | 358/3.01 |
| 2006/0188172 A1* | 8/2006 | Higurashi | G06T 5/006 |
| | | | 382/275 |
| 2007/0019860 A1* | 1/2007 | Yoshida | H04N 1/628 |
| | | | 382/162 |
| 2009/0015888 A1* | 1/2009 | Chen | H04N 1/603 |
| | | | 358/522 |
| 2009/0028431 A1* | 1/2009 | Sasaki | H04N 1/62 |
| | | | 382/167 |
| 2009/0167955 A1 | 7/2009 | Pettitt et al. | |
| 2011/0049741 A1* | 3/2011 | Brown | B28B 3/20 |
| | | | 264/40.1 |

\* cited by examiner

COLOR CONVERSION

CROSS REFERENCE TO RELATED APPLICATIONS

The present application claims priority to United Kingdom Application 1515873.6 filed on 8 Sep. 2015, the contents of which being incorporated herein by reference in its entirety.

BACKGROUND

Field

This disclosure relates to colour conversion.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Digital images or video signals represent images in a "colour space". This defines the set or gamut of colours which can be expressed by that signal, as well as defining a combination of colours representing pure primary colours and white, for example.

A number of different colour spaces have been defined. A colour space which can be handled by an item of equipment might be defined with respect to a theoretically available colour space such as the so-called CIE 1931 colour space. For example, a so-called Rec 709 colour space provides a 36% coverage of the CIE 1931 space, whereas a so-called Rec 2020 colour space provides a rather greater 76% coverage of the CIE 1931 colour space.

This means that there are colours in the Rec 2020 space which are not representable in the Rec 709 space. But note that problem this can occur even where one colour space is not in fact larger than another; there can still be colours representable in one colour space which are not representable in the other colour space.

There is therefore a general need to convert from one colour space to another. For example, a modern camera might capture images (such as images forming part of a video signal) according to the Rec 2020 colour space, but these might need to be displayed on a Rec 709 display.

SUMMARY

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
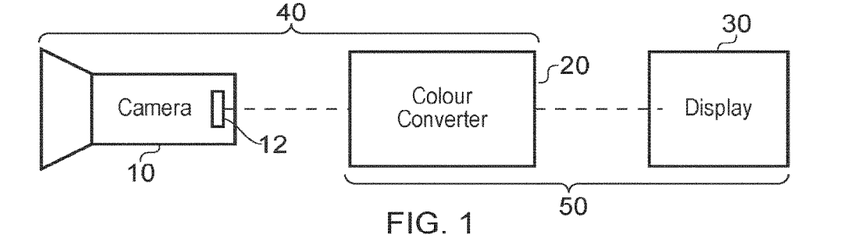
FIG. 1 schematically illustrates a camera and a display, and showing a colour conversion apparatus.

FIG. 1 schematically illustrates a camera 10 such as a video camera, having an image pick up device 12 configured to generate pixels of a captured image in an input colour space, a colour converter 20 and a display 30.

The display operates with respect to an output colour space. The input colour space and the output colour space are different colour spaces such that at least a subset of colours representable in the input colour space are not representable in the output colour space.

As mentioned above, examples of colour spaces include the so-called Rec 2020 and Rec 709 colour spaces. There are of course several other examples.

For example, in the first of these colour spaces (Rec 2020) certain colours can be represented which are simply different to, or more saturated than, the range of colours representable in the second of these colour spaces (Rec 709). Therefore, in order to display or otherwise process colours in the second (output) colour space, there is a need to convert from one colour space to another. If this is done simply by truncating otherwise unrepresentable colours into the target colour space, this can result in undesirable changes in hue, brightness and/or saturation. The colour converter 20 therefore aims to provide a better way of converting from the input colour space to the output colour space while at least alleviating some of these disadvantages.

The operation of the colour converter 20 will be discussed further below. For now, it is noted that the colour converter 20 could stand alone, or it could be part of a composite camera apparatus 40, or it could be part of a composite display apparatus 50.

In any of these instances, the colour converter 20 operates with respect to pixels of an image (or of images of a video signal) and in the case of FIG. 1 is configured to convert pixels of the captured image (in the input colour space) into pixels of an output (displayable) image in the output colour space.

Figure 2:
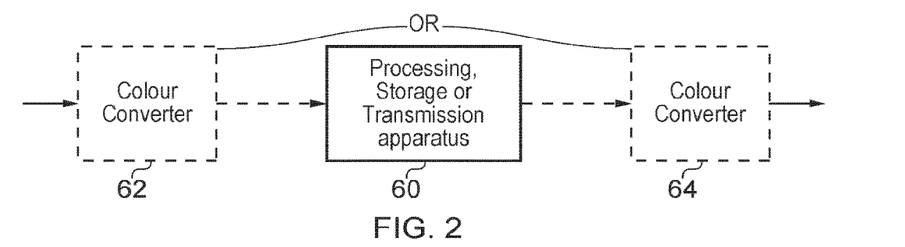
FIG. 2 schematically illustrates a processing, storage or transmission apparatus with an associated colour converter.

FIG. 2 schematically illustrates a processing, storage or transmission apparatus 60 having an associated colour converter 62, 64. Note that although the colour converter is shown twice in FIG. 2, in some embodiments only one colour converter would be associated with the processing, storage or transmission apparatus 60, associated with either the input to the apparatus or the output from the apparatus. FIG. 2 therefore provides an example of image processing, storage or transmission apparatus comprising a colour converter 62 or 64.

Figure 3:
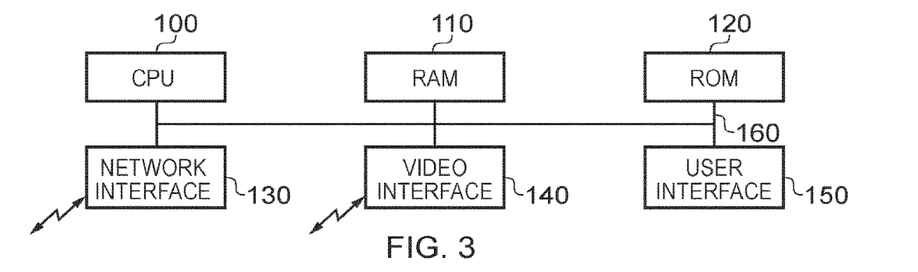
FIG. 3 schematically illustrates a data processing apparatus.

FIG. 3 schematically illustrates a data processing apparatus as an example of programmable apparatus by which the colour conversion techniques to be discussed below can be implemented. The apparatus of FIG. 3 provides an example of a software-operable programmable apparatus to implement these techniques, but it will be appreciated that in other embodiments a hard-wired physical circuit could be used, or a semi-programmable circuit such as an application specific integrated circuit (ASIC) or a field programmable gate array (FPGA) could be used.

Returning to FIG. 3, a central processing unit (CPU) 100, a random access memory (RAM) 110, a read only memory (ROM) 120, a network interface 130, a video interface 140 and a user interface 150 are all shown as example components linked together by a bus arrangement 160. In operation, the CPU 100 carries out processing instructions stored in the ROM 120 or the RAM 110, having been received, for example, via a machine-readable non-transitory storage medium and/or via the network interface 130, to process images received by the video interface 140. Processed pixel data can be stored in the RAM 110 by the CPU 100 and then passed on to a next apparatus for further handling via the video interface 140.

In general terms, the colour conversion techniques described are applicable to individual images or to video signals comprising a succession of images.

Figure 4:
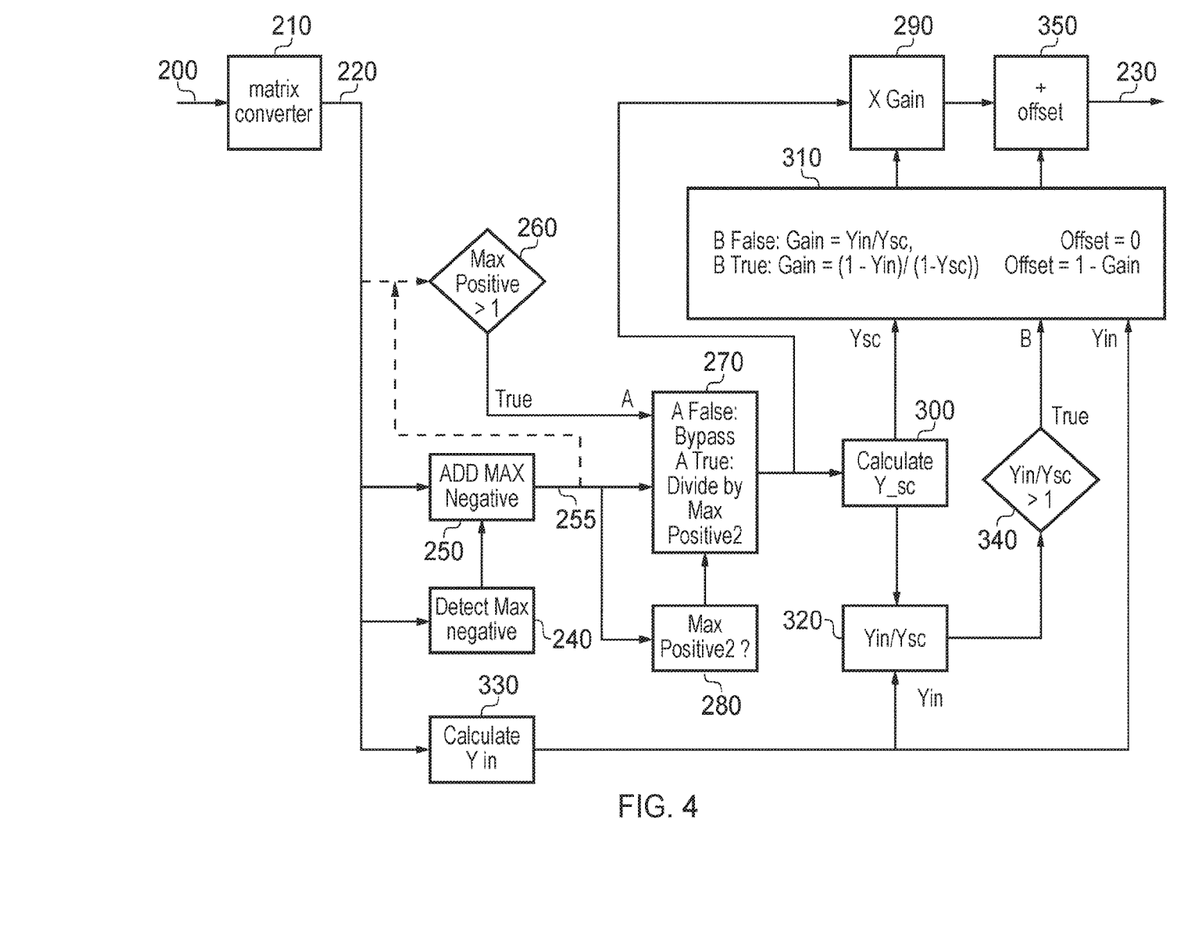
FIG. 4 schematically illustrates a colour conversion apparatus.

FIG. 4 schematically illustrates a colour conversion apparatus.

An input video signal 200 comprises successive images represented in an input colour space such as the Rec 2020 colour space. The input signal 200 is passed to a matrix converter 210 which applies a direct mapping using matrix multiplication between values of colour components of the pixels of the input signal 200 to generate a mapped signal 220. An example of such matrix conversion is described in SMPTE Recommended Practice RP177-1993.

The nature of the matrix conversion, being an example of a general mapping process, is that even if all of the colour component values in the input signal 200 are within "legal" or allowable ranges (such as between 0 and 1) there may be component values in the mapped signal 220 which are outside of those allowable ranges, being either too negative or too positive. The reasons why a component might be outside of the range could be a simple mathematical artefact, but could at a physical level relate to an attempt by the mapping provided by the matrix converter 210 to represent, in the target colour space, a colour which is allowable in the input colour space but is simply too bright or too saturated or is of a different hue such that it is unavailable in the target colour space.

The apparatus of FIG. 4 aims to provide an output signal 230 in the output colour space (for example, a Rec 709 colour space) in which colour component values are within allowable ranges such as between 0 and 1, and in which the displayable colour represented by individual pixels are close to those represented by corresponding pixels of the input signal 200, subject to the constraint that some colours (hue, brightness, saturation) are not available in the output colour space.

Note that the values of 0 . . . 1 are simply normalised examples of an allowable minimum limit and maximum (saturation) limit of the colour components.

The processing applied by the apparatus of FIG. 4 will now be described.

A "max negative" detector 240 and an adder 250 provide a processing function with respect to the mapped signal 220, by detecting instances, in the colour components of pixels of the mapped image 220, of representations of negative amounts of a colour component. The detector 240 detects the magnitude of the greatest magnitude of negative amount of the colour components of a particular pixel under test. This is referred to as the "max negative" amount, or in other words the maximum excursion in a negative sense of any of the components of that pixel. Note that "max negative" is, in this example, a positive magnitude and is added to the component values. Of course, "max negative" could be the negative value and could be subtracted from the component values.

The adder 250 then adds the "max negative" value (which is itself a positive value, being the magnitude of the greatest negative excursion) to each of the components of that pixel. The result is a processed mapped signal 255.

In these examples, the amount added to each component is equal to the "max negative" amount, but in general terms its magnitude could be greater than or equal to the magnitude of the max negative amount.

Separately, another test is applied by a detector 260, either to the pixels of the mapped signal 220 or to pixels of processed mapped image data 255 (discussed below). The optional nature of the source of input pixels for the test 260 is illustrated schematically in FIG. 4 by the use of broken lines for the two possible inputs to the box 260. Note that in practice, only one of the two possible inputs would be used, and that the effect of the remainder of the processing to be discussed below in fact means that the final effect (at the output 230 of the apparatus) can in fact be the same or substantially the same whichever of the two inputs is used). The detector 260 detects whether the greatest positive valued component of the pixel under test is greater than a maximum allowable (saturation) value, which is this example is shown as a value of 1. The detector 260 generates a true or false result, which is passed to a divider 270 as a result "A".

A detector 280 detects a value "max positive 2" which represents the maximum positive excursion of the processed mapped image data at the output of the adder 250. So, noting that the adder 250 can add an amount to the mapped image data 220 if any component of the pixel under test of the mapped image data 220 is detected to be below a minimum allowable amount, which in turn means that the processed mapped image data at the output of the adder 250 can have components which are greater than those in the mapped image data 220. The value "max positive 2" represents the highest valued component in the processed mapped image data 255 output by the adder 250, as an example of detecting the largest colour component of each pixel of the processed mapped image.

The divider 270 receives the output (the processed mapped image data) from the adder 250, the signal A and the value max positive 2. The divider 270 does nothing if the signal A is false, but if the signal A is true then the divider 270 divides all of the component values for the current pixel by the amount max positive 2. The output of the divider 270 is passed to a gain processor 290 and to a luminance detector 300.

The luminance detector 300 calculates a value Ysc which represents the luminance of the pixel under test, at the output of the divider 270. Luminance can be calculated in various ways including known ways as a scaled or weighted sum of the individual colour components. The luminance value Ysc is passed to a processor 310 and to a divider 320.

The divider 320 receives as a second input a luminance value calculated from the mapped image data 220, Yin, by a luminance detector 330. The value Yin is also passed to the processor 310.

A detector 340 detects whether Yin is greater than Ysc, or in other words whether Yin/Ysc>1. The output of this detection is represented by a second true/false signal B which is also passed to the processor 310.

The processor 310 generates gain and offset values. The gain value is applied as a multiplicative change to each colour component of the pixel by the gain processor 290, and the offset value is applied as an additive change to the output of the gain processor 290 by an offset adder 350 to generate pixels of the output signal 230.

The processor 310 generates the gain and offset values as follows:

If B is false, then:

$$\text{Gain} = Yin/Ysc$$

$$\text{Offset} = 0$$

Else if B is true, then:

$$\text{Gain} = (1-Yin)/(1-Ysc)$$

$$\text{Offset} = 1 - \text{Gain}$$

Note that these values are based on a lower limit of zero and a saturated limit of 1.

Accordingly, the arrangement of FIG. 4 can be summarised as follows.

The matrix converter 210 provides an example of mapping circuitry configured to map pixels of an input image (of the signal 200) having colour components in an input colour space to pixels of a mapped image (220) having colour components in an output colour space, the input colour space and the output colour space being different colour spaces such that at least a subset of colours representable in the input colour space are not representable in the output colour space.

The detector 240 and the adder 250 provide an example of processing circuitry configured to process the mapped image by detecting instances, in the colour components of pixels of the mapped image, of representations of negative amounts of a colour component and in response to such a detection in respect of a pixel under test, to increase all of the colour components of the pixel under test by an amount of at least the magnitude of the greatest magnitude negative amount of the colour components of that pixel under test.

The processor 310, the gain processor 290 and the offset adder 350, along with other components shown in FIG. 4 providing supporting information to allow the operation of the processor 310 to be carried out, provide an example of output circuitry configured to generate pixels of an output image (230) having colour components in the output colour space, from pixels of the processed mapped image, the output circuitry being configured to inhibit colour components of pixels of the output image from exceeding a maximum representable colour amount (such as a saturation amount), which by way of example may be considered as a value of 1, but could be another value.

For example, the processor 310 and associated components are configured to apply one or both of a gain and an offset, commonly to all colour components of a pixel of the processed mapped image, for example by detecting a luminance of each pixel of the mapped image and a luminance of the corresponding pixel of the processed mapped image, and to generate one or both of a gain and an offset value to be applied to that pixel in dependence upon the detected luminances.

The divider 270 may be an example of processing circuitry configured to divide the colour components of a pixel under test by a scaling amount dependent upon the magnitude of a largest colour component of the pixel under test, when that largest colour component exceeds a maximum representable colour amount.

Figure 5:
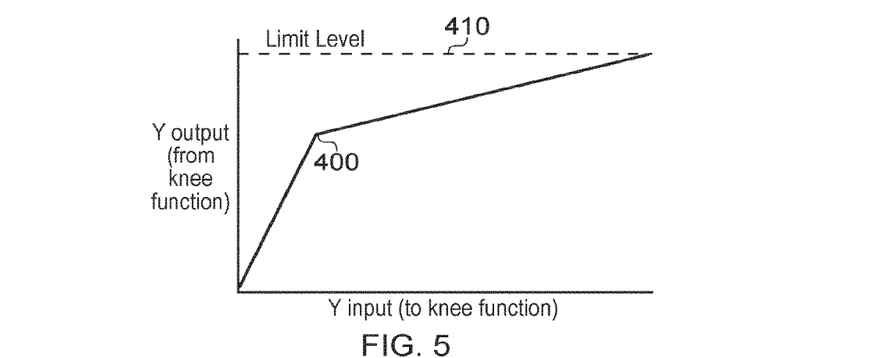
FIG. 5 schematically illustrates a knee function.

FIG. 5 schematically illustrates a so-called knee function which maps luminance values to luminance values, such that a horizontal axis represents luminance values input to the knee function and a vertical axis represents luminance values output from the knee function. The knee function represents two portions of a relationship between the input and output luminance values having different slopes of otherwise straight line curves. The two curved portions meet at a point 400 referred to (from its appearance) as a knee. Knee processing is sometimes used to help avoid a luminance value exceeding a limit level 410.

Figure 6:
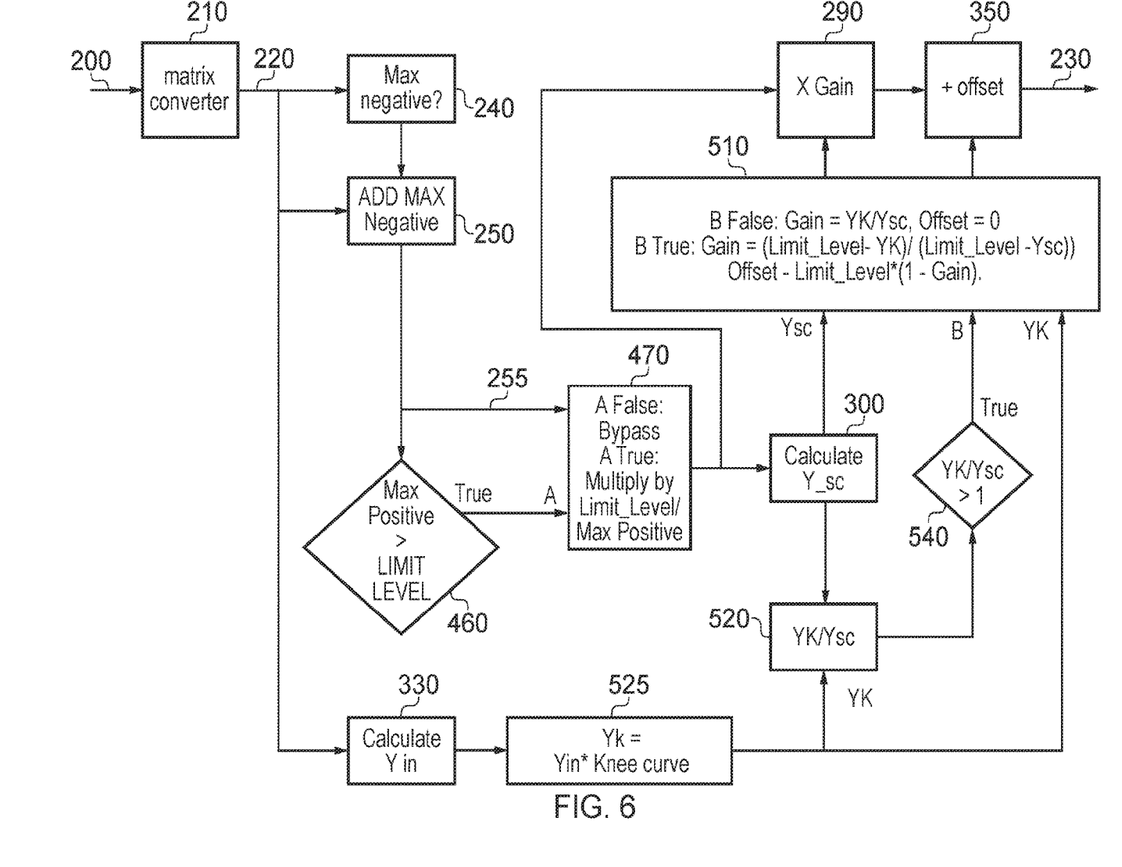
FIG. 6 schematically illustrates another example of a colour conversion apparatus.

FIG. 6 schematically illustrates another example of a colour conversion apparatus. Several aspects are similar to those discussed with reference to FIG. 4 and will not be discussed again in detail. There are various differences however.

Firstly, the "max positive" detection is carried out with respect to the processed mapped signal output by the adder 250, by a detector 460. A divider 470 divides by the max positive level detected at the output of the adder 250, which in fact is the same as the value max positive 2 used in FIG. 4. Therefore, although the actual division by the divider is by the same amount, the detection of whether or not to carry out the division is based upon a detection of a positive excursion beyond a limit level in the processed mapped video signal in FIG. 6, whereas the detection on which the decision is based is according to the mapped video signal in FIG. 4.

A second difference is that instead of the divider 320 acting on Yin and Ysc, a divider 520 acts on Yk and Ysc, where Yk is Yin to which a knee curve of the type shown in FIG. 4 has been applied by a multiplier 525. The value Yk is also applied to a processor 510 taking the place of the processor 310.

A third difference is that instead of the detector 340 acting on a ratio of Yin and Ysc, a detector 540 acts on the ratio Yk/Ysc produced by the divider 520.

A final difference is in the way that the processor 510 works which is as follows:

If B is false then $$\text{Gain} = YK/Ysc$$

$$\text{Offset} = 0$$

Else if B is true then:

$$\text{Gain} = (\text{Limit\_Level} - YK)/(\text{Limit\_Level} - Ysc))$$

$$\text{Offset} = \text{Limit\_Level} * (1 - \text{Gain})$$

Note that Limit_level is the upper allowable limit. The lower allowable limit is taken to be zero in this example.

An example formula to calculate luminance (Y) from red (R), green (G) and blue (B) components is Y=0.25R+0.666R+0.084B.

An example of this operation concerns the arrangement of FIG. 4, where B is false:

|  | R | G | B | Other |
|---|---|---|---|---|
| Signal 220 | 1.25 | −0.5 | 1 |  |
| Max positive | 1.25 |  |  | A = true |
| Max negative |  | 0.5 |  |  |
| Signal 255 | 1.75 | 0 | 1.5 |  |
| Max Positive 2 | 1.75 |  |  |  |
| Output of divider 270 | 1 | 0 | 0.857 |  |
| Yin |  |  |  | Yin = 0.064 |
| Ysc |  |  |  | Ysc = 0.322 |
| Yin/Ysc |  |  |  | B = false |
| Gain |  |  |  | Gain = 0.199 |
| Offset |  |  |  | Offset = 0 |
| Signal 230 | 0.197 | 0 | 0.169 | Yout = 0.064 |

A second example concerns the arrangement of FIG. 4, but where B is true:

|  | R | G | B | Other |
|---|---|---|---|---|
| Signal 220 | 1.25 | 1 | −0.5 |  |
| Max positive | 1.25 |  |  | A = true |
| Max negative |  |  | 0.5 |  |
| Signal 255 | 1.75 | 1.5 | 0 |  |
| Max Positive 2 | 1.75 |  |  |  |
| Output of divider 270 | 1 | 0.857 | 0 |  |
| Yin |  |  |  | Yin = 0.936 |
| Ysc |  |  |  | Ysc = 0.821 |
| Yin/Ysc |  |  |  | B = true |
| Gain |  |  |  | Gain = 0.355 |
| Offset |  |  |  | Offset = 0.645 |
| Signal 230 | 1 | 0.949 | 0.645 | Yout = 0.936 |

In each case, it can be seen that despite the pixel of the signal 220 having one or more component values outside the allowable range (which in this example is 0 . . . 1), the outcome is that the luminance Y at the output signal 230 is the same as the luminance Yin at the signal 220.

Figure 7:
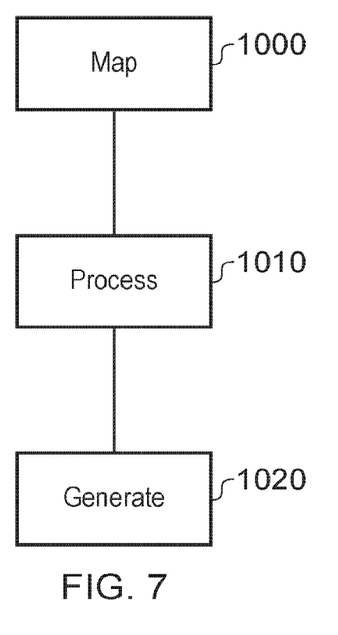
FIG. 7 is a schematic flowchart illustrating a colour conversion method.

FIG. 7 is a schematic flowchart illustrating a colour conversion method comprising:

at a step 1000, mapping pixels of an input image having colour components in an input colour space to pixels of an mapped image having colour components in an output colour space, the input colour space and the output colour space being different colour spaces such that at least a subset of colours representable in the input colour space are not representable in the output colour space;

at a step 1010, processing the mapped image by detecting instances, in the colour components of pixels of the mapped image, of representations of negative amounts of a colour component and in response to such a detection in respect of a pixel under test, increasing all of the colour components of the pixel under test by an amount of at least the magnitude of the greatest magnitude negative amount of the colour components of that pixel under test; and at a step 1020, generating pixels of an output image, having colour components in the output colour space, from pixels of the mapped image, the generating step comprising inhibiting colour components of pixels of the output image from exceeding a maximum representable colour amount.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective embodiments are defined by the following numbered clauses:

1. Colour conversion apparatus comprising:

mapping circuitry configured to map pixels of an input image having colour components in an input colour space to pixels of an mapped image having colour components in an output colour space, the input colour space and the output colour space being different colour spaces such that at least a subset of colours representable in the input colour space are not representable in the output colour space;

processing circuitry configured to process the mapped image by detecting instances, in the colour components of pixels of the mapped image, of representations of negative amounts of a colour component and in response to such a detection in respect of a pixel under test, to increase all of the colour components of the pixel under test by an amount of at least the magnitude of the greatest magnitude negative amount of the colour components of that pixel under test; and output circuitry configured to generate pixels of an output image, having colour components in the output colour space, from pixels of the processed mapped image, the output circuitry being configured to inhibit colour components of pixels of the output image from exceeding a maximum representable colour amount.

2. Apparatus according to clause 1, in which the processing circuitry is configured to divide the colour components of a pixel under test by a scaling amount dependent upon the magnitude of a largest colour component of the pixel under test, when that largest colour component exceeds a maximum representable colour amount.

3. Apparatus according to clause 2, in which the processing circuitry is configured to detect the largest colour component of each pixel of the mapped image.

4. Apparatus according to clause 2, in which the processing circuitry is configured to detect the largest colour component of each pixel of the processed mapped image.

5. Apparatus according to any one of the preceding clauses, in which the output circuitry is configured to apply one or both of a gain and an offset, commonly to all colour components of a pixel of the processed mapped image.

6. Apparatus according to clause 5, comprising detection circuitry configured to detect a luminance of each pixel of the mapped image and a luminance of the corresponding pixel of the processed mapped image, and to generate one or both of a gain and an offset value to be applied to that pixel in dependence upon the detected luminances.

7. Apparatus according to clause 6, in which the detection circuitry is configured to apply a knee curve mapping to the luminance of each pixel of the mapped image.

8. A camera comprising:

an image pickup device configured to generate pixels of a captured image in the input colour space; and apparatus according to any one of the preceding clauses, configured to convert pixels of the captured image into pixels of an output image in the output colour space.

9. Image processing, storage, display or transmission apparatus comprising apparatus according to any one of clauses 1 to 7.

10. A colour conversion method comprising:

mapping pixels of an input image having colour components in an input colour space to pixels of an mapped image having colour components in an output colour space, the input colour space and the output colour space being different colour spaces such that at least a subset of colours representable in the input colour space are not representable in the output colour space;

processing the mapped image by detecting instances, in the colour components of pixels of the mapped image, of representations of negative amounts of a colour component and in response to such a detection in respect of a pixel under test, increasing all of the colour components of the pixel under test by an amount of at least the magnitude of the greatest magnitude negative amount of the colour components of that pixel under test; and generating pixels of an output image, having colour components in the output colour space, from pixels of the mapped image, the generating step comprising inhibiting colour components of pixels of the output image from exceeding a maximum representable colour amount.

11. Computer software which, when executed by a computer, causes the computer to carry out the method of clause 10.

12. A non-transitory machine-readable storage medium which stores computer software according to clause 11.

The invention claimed is:

1. An apparatus comprising:
    mapping circuitry configured to map pixels of an input image having colour components in an input colour space to pixels of an mapped image having colour components in an output colour space, the input colour space being larger than the output colour space;
    processing circuitry configured to process the mapped image by (i) detecting a pixel among the pixels of the mapped image, the pixel having negative amounts of colour components and (ii) changing all colour components of the pixel at least by the greatest magnitude of the negative amounts of colour components of the pixel; and
    output circuitry configured to generate pixels of an output image, having colour components in the output colour space, from pixels of the processed mapped image, the output circuitry being configured to inhibit colour components of pixels of the output image from exceeding a maximum representable colour amount.

2. The apparatus according to claim 1, in which the processing circuitry is configured to divide the colour components of a pixel under test by a scaling amount dependent upon the magnitude of a largest colour component of the pixel under test, when that largest colour component exceeds a maximum representable colour amount.

3. The apparatus according to claim 2, in which the processing circuitry is configured to detect the largest colour component of each pixel of the mapped image.

4. The apparatus according to claim 2, in which the processing circuitry is configured to detect the largest colour component of each pixel of the processed mapped image.

5. The apparatus according to claim 1, in which the output circuitry is configured to apply one or both of a gain and an offset, commonly to all colour components of a pixel of the processed mapped image.

6. The apparatus according to claim 5, further comprising:
    detection circuitry configured to detect a luminance of each pixel of the mapped image and a luminance of the corresponding pixel of the processed mapped image, and to generate one or both of a gain and an offset value to be applied to that pixel in dependence upon the detected luminance.

7. The apparatus according to claim 6, in which the detection circuitry is configured to apply a knee curve mapping to the luminance of each pixel of the mapped image.

8. A camera comprising:
    an image pickup device configured to generate pixels of a captured image in the input colour space; and
    the apparatus according to claim 1, configured to convert pixels of the captured image into pixels of an output image in the output colour space.

9. The apparatus according to claim 1 included in one of image processing, non-transitory storage, display, or transmission apparatus.

10. A method comprising:
    mapping pixels of an input image having colour components in an input colour space to pixels of an mapped image having colour components in an output colour space, the input colour space being larger than the output colour space;
    processing the mapped image by (i) detecting a pixel among the pixels of the mapped image, the pixel having negative amounts of colour components and (ii) changing all colour components of the pixel at least by the greatest magnitude of the negative amounts of colour components of the pixel; and
    generating pixels of an output image, having colour components in the output colour space, from pixels of the mapped image, the generating step comprising inhibiting colour components of pixels of the output image from exceeding a maximum representable colour amount.

11. A non-transitory machine-readable storage medium which stores computer software, when executed by a computer, causes the computer to perform the method of claim 10.

* * * * *